Dec. 11, 1945.  E. H. SCHOEN  2,390,558
ENGINE CRANK SHAFT TO PISTON CONNECTING MECHANISM
Filed March 7, 1944  4 Sheets-Sheet 1
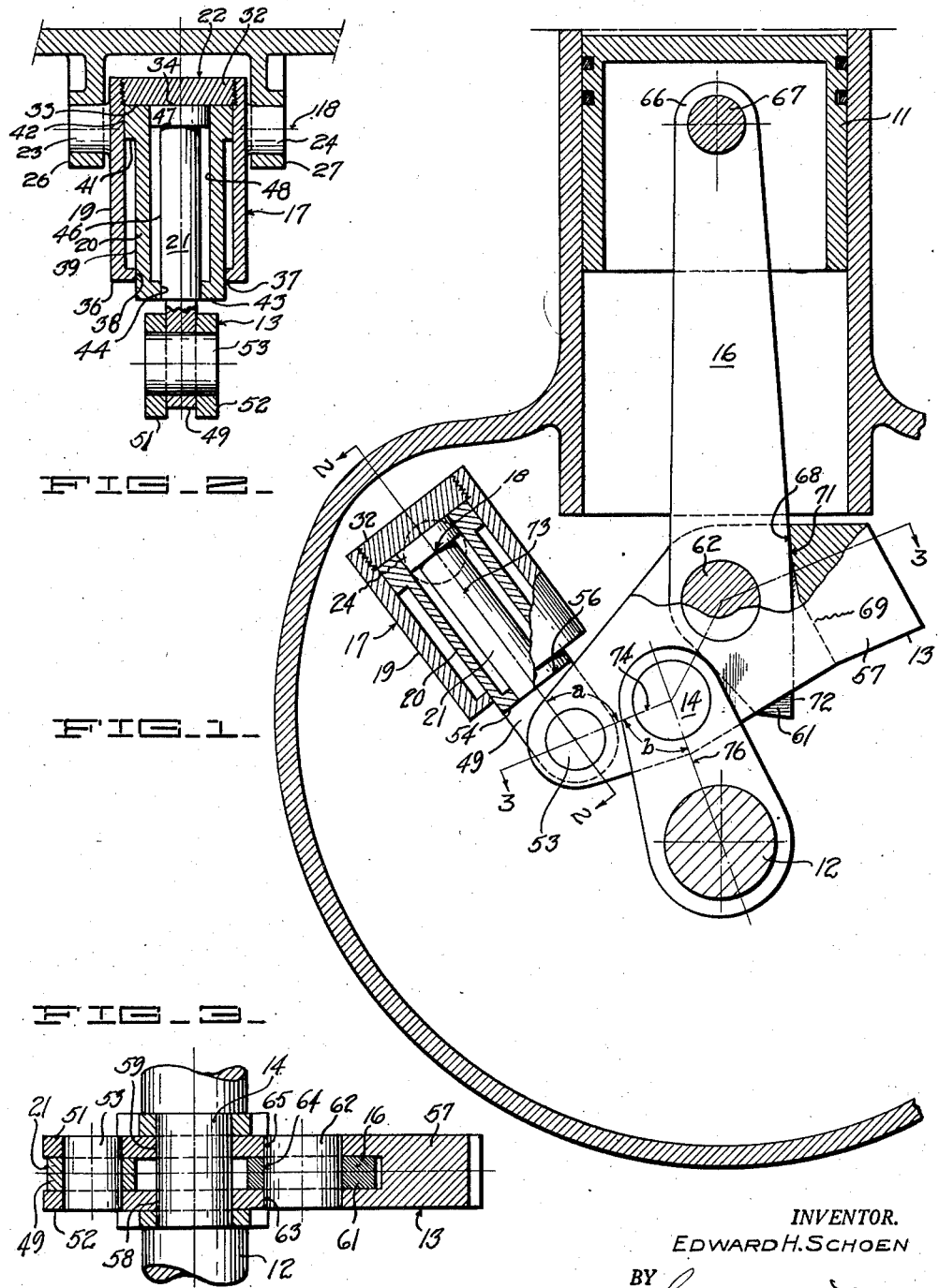
INVENTOR.
EDWARD H. SCHOEN
BY Gardner & Warren
HIS ATTORNEYS

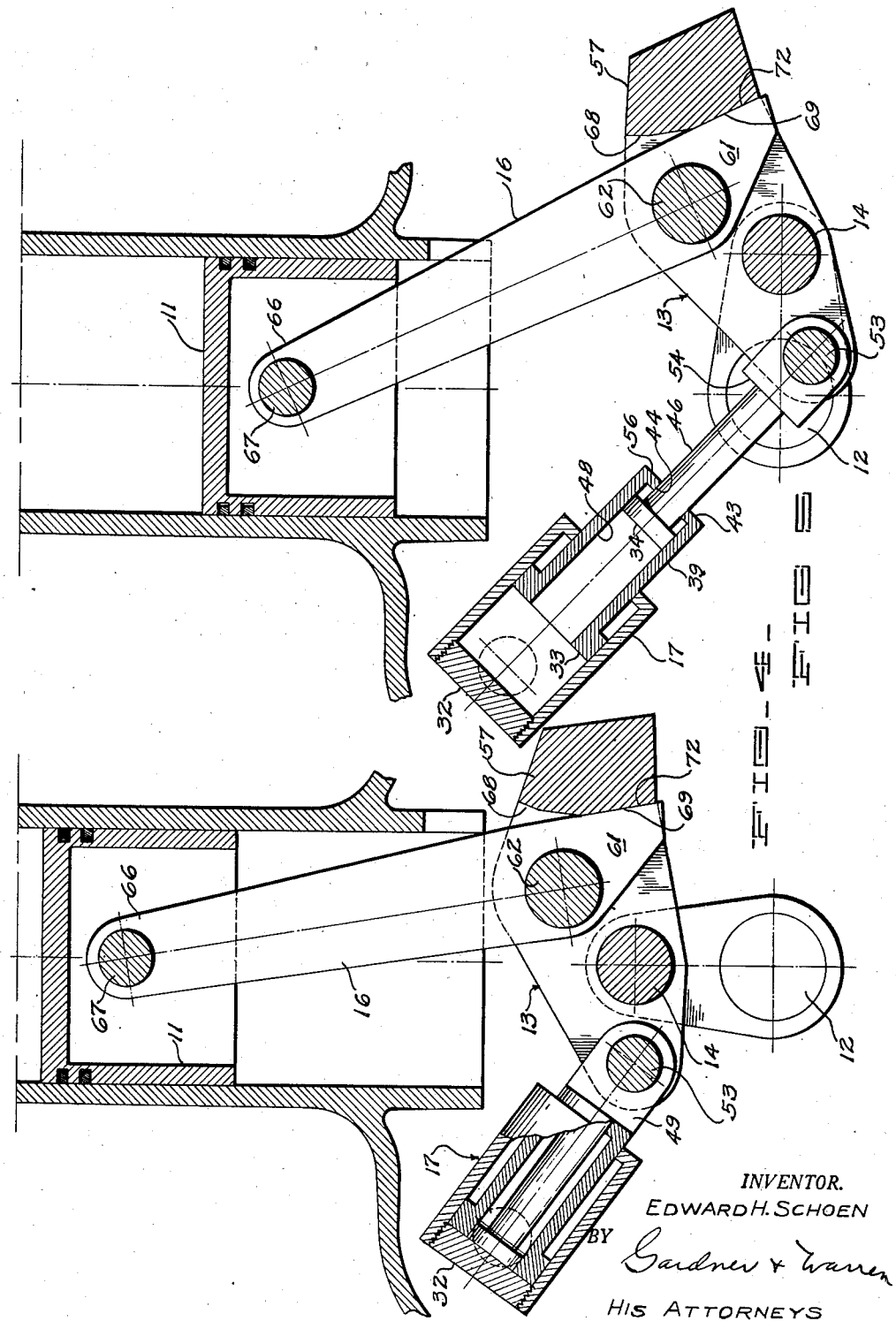

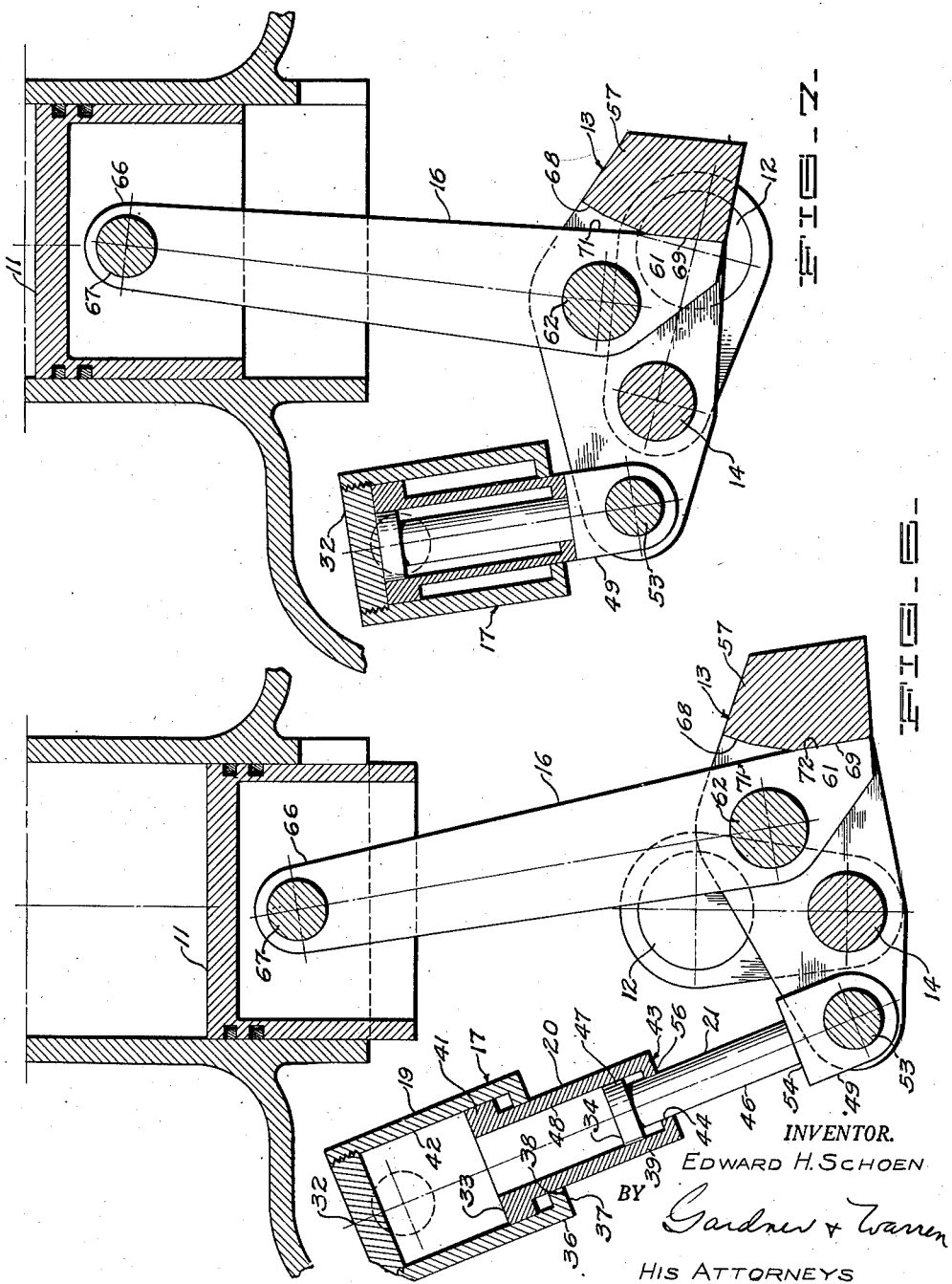

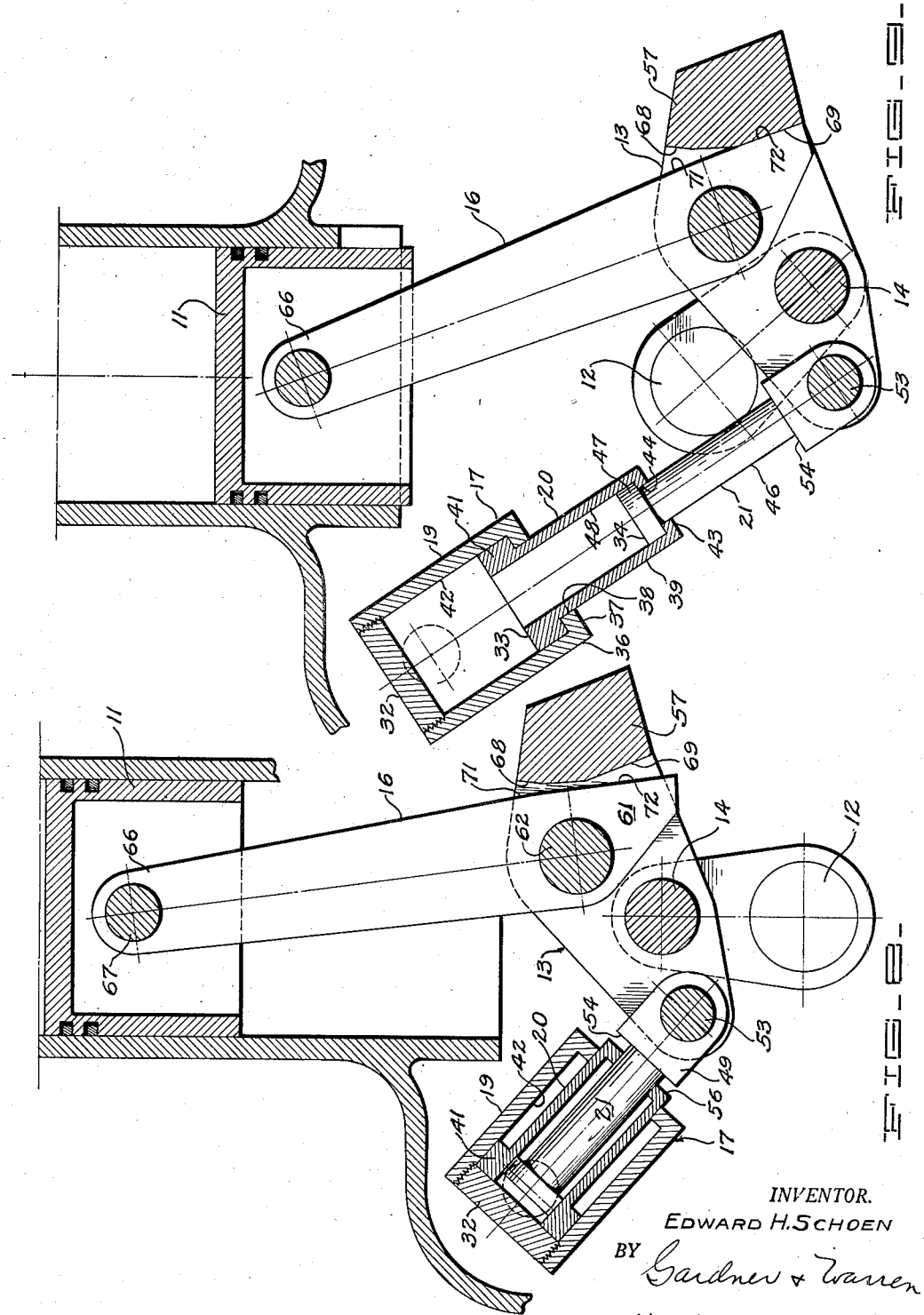

Patented Dec. 11, 1945

2,390,558

UNITED STATES PATENT OFFICE 2,390,558

ENGINE CRANKSHAFT TO PISTON CONNECTING MECHANISM

Edward H. Schoen, Honolulu, Territory of Hawaii

Application March 7, 1944, Serial No. 525,400

14 Claims. (Cl. 123—197)

The invention relates to mechanisms and arrangements for connecting the piston to the crank shaft of an internal combustion engine.

The mechanism of the present invention has as its principal objects and functions the lengthening of the duration of the usual power stroke to extend substantially in excess of the conventional 180° of crank shaft rotation; the increasing of the mechanical advantage of force application by the piston to the crank shaft during the power stroke; the shortening of the duration of the compression stroke and increasing the rate of compression adjacent the end thereof to obtain a higher usable instantaneous end pressure with less fluid loss than heretofore obtainable; an increasing of the duration of the intake stroke with a piston acceleration ad'acent the end thereof to obtain a better filling of the cylinder with fuel gas mixture; and an improved exhaust stroke including an acceleration of the piston adjacent the end of the stroke rnd a holding up of the piston at the end of the stroke to insure a maximum discharge of the spent products of combustion.

Another object of the invention is to provide a mechanism of the character described which is adaptable for use with or incorporation in existing Otto or Diesel, two or four cycle, "in line," V or "radial" internal combustion engines.

A further object of the invention is to provide a mechanism of the character above which is constructed of a minimum number of sturdily formed parts, designed to withstand the heavy loads to which the mechanism is subjected and to endure under such loads for a substantially indefinite period of time with minimum wear or requirement for adjustment or repair.

The invention possesses other objects and features of advantage, some of which, with the foregoing, will be set forth in the following description of the prefered form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a fragmentary vertical sectional view of an internal combustion engine showing a mechanism constructed in accordance with the present invention.

Figure 2 is a cross-sectional view of a portion of the mechanism taken substantially on the plane of line 2—2 of Figure 1.

Figure 3 is a cross-sectional view of another portion of the mechanism taken substantially on the plane of line 3—3 on Figure 1.

Figure 4 is a view similar to Figure 1, but showing the position of the parts with the crank throw rotated to top center position during the power stroke.

Figure 5 is a view similar to Figures 1 and 4, but showing the crank throw rotated to a further advanced position.

Figure 6 is a view similar to Figure 1, but showing the crank throw at its bottom center position at the end of the power throw.

Figure 7 is a view similar to Figure 1, showing the crank throw rotated to a position adjacent the end of the exhaust stroke.

Figure 8 is a view similar to Figure 7, but showing the crank shaft rotated to a top center position at the beginning of the intake stroke.

Figure 9 is a view similar to Figure 8, but showing the crank throw rotated to adjacent the end of the intake stroke.

The mechanism as illustrated in the accompanying drawings is adapted for connecting the piston 11 to the crank shaft 12 of an internal combustion engine, and comprises, in brief, the combination of a lever 13, journalled on the throw 14 of the crank shaft 12, and pivotally connected to a piston connecting rod 16 and to one end of an expansible and contractible link member 17, the other end of which link member is pivotally supported for movement around a fixed axis 18. In the arrangement of parts here shown, the lever is journalled intermediate its ends to the throw 14, the connections of the rod 16 and member 17 to the lever are effected on opposite sides of the throw, with the connecting rod leading and the link member lagging the movement of the throw near its top center position (see Figure 1), and the aforesaid fixed axis of rotation of the link member is located in the quadrant preceding the top center position of the throw and outside of the circumferential path of the throw.

The expansible link member 17 s so constructed as to provide fixed limits of expansion and contraction to control the path and character of movement of the several parts at certain points in the cycle of operation. In the mechanism here shown, this member is composed of a plurality of concentrically arranged telescopically engaged sections 19, 20 and 21. The outer section 19 is of hollow cylindrical form and is provided adjacent its outer end 22 with diametrically extending trunions 23 and 24 (see Figure 2) which are journalled in aligned bearings 26 and 27 carried by portions of the crank case 31. The axis of rotation of these trunnions provides the aforesaid fixed axis 18. A cap or plug 32 is attached to and closes the outer end of the section 19, and as will be seen from the drawings, serves as a stop for the outer ends 33 and 34 of the inner sections 20 and 21. The opposite (inner) end 36 of the outer section is formed with an inturned annular flange 37 which provides a center aperture bearing 38 for slidably supporting the cylindrical outer side 39 of the intermediate section 20. Formed at the outer end 33 of the section 20 is an external shoulder 41 which slidably engages the interior cylindrical surface 42 of the outer section and is adapted to abut the interned flange 37 at the lower end of the outer section to limit the distension of the intermediate section 20 from the outer section 19. The intermediate section 20 is similarly constructed with an inturned flange 43 at its lower end which provides a center aperture bearing 44 for the exterior surface 46 of the inner section 21, and the latter is provided at its inner end 34 with an external shoulder 47 which slidably engages the interior surface 48 of the intermediate section 20 and is adapted to abut the interned flange 43 to limit the distension of the inner section 21 from the intermediate section 20. The lower (extending) end 49 of the inner section is here widened and flattened so as to fit between opposed parallel sides 51 and 52 of the lever 13 and is secured to such sides by a pivot pin 53. A shoulder 54 thus provided on the end portion 49 serves to engage the end face 56 of the intermediate section 20 upon contraction of the assembly and to move the intermediate section to a compacted position as illustrated in Figure 1.

The several parts of the link member in sliding engagement with each other are arranged to permit the free, rapid and complete expansion and contraction of the link member between the fixed limits aforesaid, so that as more fully hereinafter described the control of the link member of the movement of the other parts occurs only when the link member is in its fully expanded or contracted positions, the link member functioning in its intermediate positions as a freely expanding or contracting follower member.

The lever 13, as viewed in Figure 3, is here of U shape construction including the aforesaid spaced parallel sides 51 and 52 and a solid end portion 57. The crank throw 14 is mounted through aligned bearing openings 58 and 59 in the sides 51 and 52 substantially perpendicular thereto. Mounting of the connecting rod 16 to the lever is effected by positioning the lower rod end 61 between the spaced lever sides 52 and 53 and securing the same in place intermediate the crank throw and the lever end 57 by means of a pivot pin 62 mounted in aligned bearing openings 63, 64 and 65 in the lever sides and the connecting rod. Connection of the upper end 66 of the connecting rod 16 to the piston 11 may be effected in the usual fashion by a pivot pin 67. As will be noted from the foregoing and from the drawings all of the axes of rotation provided the several parts mentioned are parallel to each other and to the axis of rotation of the crank shaft.

As an important feature of the present invention, means is provided for limiting the relative movement of the connecting rod and lever and for coacting with the other parts to hold the connecting rod and lever against relative pivotal movement during certain portions of the operating cycle, as more fully hereinafter explained. In the present construction this means is provided by a pair of, angularly related, faces 68 and 69 on the inside of the lever end 57 which coact with juxta-positioned, angularly related, faces 71 and 72 on the connecting rod to limit the relative pivotal movement between the connecting rod and lever about their pivot pin 62. The engagement and disengagement of these opposed faces and the effect thereof on the operation of the mechanism is described below.

Other structural and functional features of the mechanism and several parts thereof will appear in the following description of the operation. For necessary completeness of description, the mechanism will be followed through a four cycle engine operation.

*Power stroke*

The design and arrangement of the foregoing parts makes possible the starting of this stroke well ahead of the usual top center position of the crank throw. In the mechanism as illustrated in the accompanying drawings (see Figure 1) the piston passes over its top position at the end of the preceding compression stroke at approximately 20° ahead of the top center position of the crank throw. Ignition (by compression or spark) is timed to take place adjacent this point. The downward force thereafter applied to the piston 11 is transmitted through the connecting rod 16 to the lever 13, tending to cause a clock-wise rotation of the lever about the crank throw 14 and to elevate the opposite end of the lever towards the fixed axis of rotation 18 of the link member 17. The link member is fully contracted at this point. As will be seen from Figure 1, the included angle "a" between the longitudinal axis 73 of the link member (line intersecting axis 18 and center of pivot pin 53), and line 74 (connecting the centers of pivot pin 53 and the crank throw 14), is, in this position of the parts, greater than 90°; while the included angle b, between line 74 and line 76, is substantially 90°, thus placing the crank throw approximately perpendicular to the forces acting on the lever. As a result the reaction (supporting) force at the crank throw is substantially neutral from a crank shaft rotation standpoint, while the resultant of the applied and reaction forces at the link member causes the latter to swing upwardly, counterclockwise, about its fixed axis 18 thereby displacing the various parts to the right (as viewed in Figure 1) and rotating the crank shaft in a clockwise direction. The operation described may be compared with that of a toggle with the link member and lever forming the toggle links and the pivot pin 53 the toggle knee. As the crank throw approaches its top center position (see Figure 4) the link member axis 73 and lever axis 74 approach alignment at which point, and with the crank throw going away from the link member, the latter would lose its toggle or crowding function of urging rotation of the crank throw. Before this point is reached however, and at or about the top center position of the crank throw, the connecting rod 16 and the lever 13 reach one limit of their relative rotation and lock together as an integral L shaped connecting rod for directly applying a rotative force to the crank shaft for the balance of the power stroke. This occurs when, due to the orientation of the parts during the power stroke near the top center position of the crank throw, face 69 on the lever engages face 72 on the connecting rod, and is held in engagement therewith to the bottom center position of the throw due to the turning moment imparted to the lever by the power thrust transmitted through the connecting rod (see Figures 4, 5 and 6). Thus the power stroke is started well in advance of the top center position of the throw (about 20° in the arrangement of the mechanism here shown) and extends to the bottom center position of the throw, to thereby extend well in excess of the usual 180° of crank shaft rotation. In the present mechanism, the parts may be designed and arranged if desired to produce a much longer power stroke than here shown and extending through at least 220° of crank shaft rotation; although a power stroke of about 200°, as here illustrated, is generally recommended. Besides increasing the duration of the power stroke as above explained, the present mechanism provides an important advantage in increasing the mechanical advantage in the application of the power thrust to the crank shaft, particularly during the last 180° of the power stroke. During this part of the stroke, the turning moment applied to the crank shaft is increased due to the offset relation of the connecting rod and portion of the lever between the throw and connecting rod. This increase in mechanical advantage enabling the power thrust to produce greater crank shaft torque throughout the last 180° of the power stroke is clearly shown in Figures 4, 5 and 6. It will be noted that the mechanical advantage is already substantial at the top center position of the throw (see Figure 4), where in the conventional arrangement the mechanical advantage is zero, and increases rapidly to during the next 90° of crank shaft rotation as shown in Figure 5. During the last 180° of the power stroke the link member 17 expands (by a drawing out of its sections) without affecting the movement of the other parts and reaches approximately its limit of expansion as the throw moves to near its bottom center position.

*Exhaust stroke*

The exhaust stroke is here arranged to start at the bottom center position of the crank throw as shown in Figure 6. At this point the task of moving the assembly is taken over by the crank shaft. The turning movement applied to the lever by the crank throw and the resistance to movement offered by the connecting rod and piston, causes the faces 69 and 72 on the lever and connecting rod to remain in engagement with the result that the connecting rod and piston are elevated as the throw moves upwardly from its bottom position. The link member now starts to contract and reaches its minimum length as the throw moves to position illustrated in Figure 7. The full contraction of the link member at this point checks the upward movement of the end of the lever pivoted to the link and sends up the opposite lever end connected to the connecting rod 16 with the result that the upward piston movement is rapidly accelerated. As will be understood this acceleration occurs toward the end of the exhaust stroke when the spent gases being discharged are already in motion and causes the piston to follow and to continue to impart a driving force to the gases to the very end of the stroke to thereby insure maximum discharge of the gases. The rocking of the lever 13 caused by the contraction of the link member, as above explained, causes a relative movement of the lever and connecting rod about their pivot pin 62 to swing the lever and rod faces 69 and 72 out of engagement. This rocking of the lever, and the attendant upward movement of the piston and connecting rod continues until, at about the position of the parts illustrated in Figure 1, the lever and connecting rod faces 68 and 71 engage to stop the upward movement of the piston. As the crank throw rotates ahead from the position illustrated in Figure 1, the faces 68 and 71 first separate and then re-engage during the next approximately 20° of the crank shaft rotation so that during movement of the throw from position illustrated in Figure 1, to approximately its top center position, as illustrated in Figure 8, the piston may remain substantially stationary in its top position. At or about the top center position of the throw, and as aforesaid, the faces 68 and 71 re-engage so as to require the downward movement of the connecting rod and piston with further rotation of the crank throw. The point of ending of the exhaust stroke and beginning of the intake stroke may be selected, at the discretion of the designer of the engine, at any point throughout the above mentioned range of about 20° of crank shaft rotation, from the position of the parts illustrated in Figure 1 to the top center position of the throw, illustrated in Figure 8. It is recommended that a portion of this part of the cycle be allocated to each of the exhaust and intake strokes. The holding up of the piston at the end of the exhaust stroke is beneficial in assuring a complete discharge of the spent gases. The starting of the intake stroke prior to the top center position of the throw affords a greater period of time during the intake stroke for filling the cylinder with fuel gases. As will be understood, the relative positioning of the lever and connecting rod faces 68, 69, 71 and 72 may be adjusted to control the duration of the above described holding up of the piston at the top of its stroke.

*Intake stroke*

This stroke starts, as above described, adjacent, but preferably prior to the top center position of the crank throw as illustrated in Figure 8, and as the throw moves downwardly, the engagement of the lever and connecting rod faces 68 and 69 require, as above described, the connecting rod and the piston rod to follow. The sections of the link member 17 draw out and reach their limit of expansion during movement of the throw into the quadrant preceding the bottom center position of the throw (diametrically opposite the quadrant first mentioned wherein the link member is fully compressed). This position of the several parts is illustrated in Figure 9. As the link member reaches its limit of expansion, the free downward movement of the left end of the lever connected thereto, is checked and caused to move on an arc about the fixed axis 18 of the link member as a center. Upon checking of the free downward movement of this end of the lever, the opposite lever end (pivoted to the connecting rod) is caused to swing rapidly downward thus accelerating the piston movement. This lever action and resultant piston acceleration continues to the bottom center position of the crank throw as illustrated in Figure 6 and is beneficial in obtaining maximum filling of the cylinder with fuel gas mixture.

*Compression stroke*

The rocking of the lever as described at the end of the intake stroke re-engages the lever and connecting rod faces 69 and 72 at the bottom center position of the crank throw as shown in Figure 6. The movement and positioning of the parts on the ensuing compression stroke is the same as during the exhaust stroke above described, except for the action adjacent the end of the stroke. During the compression stroke and ensuing power stroke, the high pressure on the top of the piston prevents the holding up of the piston as described in connection with the exhaust stroke. The parts move from position shown in Figure 6 to position shown in Figure 5. There is then, as described above, an acceleration of the piston movement until the parts reach their positions shown in Figure 1 when the piston is at the top of its compression stroke and the power stroke commences. It will thus be apparent that the duration of the compression stroke is considerably less than the conventional compression stroke, and in the mechanism here illustrated extends through approximately 160° of crank shaft rotation. This reduction in time of compression and the acceleration of the rate of compression to produce a high instantaneous compression pressure at the end of the stroke, is very desirable in that leakage past the piston is reduced to a minimum, tendency toward preignition is reduced and higher compression pressures may be used with an attendant gain in engine efficiency.

The timing of the engine must of course be set to cause appropriate ignition and opening and closing of the intake and exhaust valves of the engine at or adjacent to the beginning and ending of the above described strokes in the usual manner well known in the art. It will also be understood that while the operation of the mechanism has been described above in connecwith a 4-cycle engine operation, the mechanism may also be used in a 2-cycle engine, wherein each piston down stroke is a power and partial exhaust stroke and each piston up stroke is an exhaust and a compression stroke. Further it will be clear that the mechanism may be used in an engine operating on either an otto or Diesel cycle.

It will be noted that a feature of the present construction is that all of the parts may be positioned, as here shown, in the plane of rotation of the crank throw and within the longitudinal dimension thereof (see Figure 3), or various of the parts may be readily offset longitudinally so as to adapt the mechanism to the available space and arrangement of parts found in various types of "in line," V or "radial" engines.

I claim:

1. In a mechanism for connecting the piston connecting rod to the crank shaft throw of an internal combustion engine, the combination of a lever journalled on said throw and pivotally connected to said connecting rod, a link member pivotally secured at one end about a fixed axis and pivotally connected at its other end to said lever and formed to freely expand and contract its length between said ends within fixed limits of expansion and contraction, and means functioning through a portion of the cyclic movement of said connecting rod and lever to hold the same against relative rotation.

2. In a mechanism for connecting the piston connecting rod to the crank shaft throw of an internal combustion engine, the combination of a lever journalled on said throw and pivotally connected to said connecting rod, an expansible and contractible link member pivotally secured at one end about a fixed axis and pivotally connected at its other end to said lever, and abutting faces on said lever and connecting rod movable into engagement during the power stroke of said piston to hold said connecting rod and level against relative rotation.

3. In a mechanism for connecting the piston to the crank shaft of four cycle internal combustion engine, a lever journalled on the throw of said crank shaft, a connecting rod for said piston pivoted to said lever, an expansible and contractible link member having fixed limits of expansion and contraction pivoted at one end about a fixed axis and at its other end to said lever, and a pair of angularly related faces on said lever engageable with said connecting rod during the power stroke and adjacent the end of the exhaust stroke of the said piston to prevent during period of engagement relative pivotal movement between said connecting rod and lever.

4. A piston crank shaft connecting mechanism for an internal combustion engine comprising, a lever pivotally connected intermediate its ends to the crank shaft throw, a piston connecting rod pivotally connected to said lever adjacent one end thereof, an extensible link member pivotally connected at one end about a fixed axis and pivotally connected at its opposite end to the opposite end of said lever, said link member having fixed limits of expansion and contraction, and means holding said connecting rod and lever against relative rotation about their pivotal connection during portions of the cyclic travel thereof.

5. In a mechanism for connecting the piston connecting rod to the crank shaft throw of an internal combustion engine, a lever journalled intermediate its ends to said throw and adjacent one end to said connecting rod, an expansible and contractible link member having fixed limits of expansion and contraction pivotally connected at one end to the opposite end of said lever and at its other end about a fixed axis parallel to the axis of rotation of said crank shaft, and means preventing relative movement between said connecting rod and lever during a portion of the cyclic movement thereof, the foregoing parts being formed and positioned and coacting to provide a piston down stroke greater than 180° of crank shaft rotation and a piston up stroke less than 180° of crank shaft rotation.

6. In a mechanism for connecting the piston connecting rod to the crank shaft throw of an internal combustion engine, a lever journalled intermediate its ends to said throw and adjacent one end to said connecting rod, an expansible and contractible link member having fixed limits of expansion and contraction pivotally connected at one end to the opposite end of said lever and at its other end about a fixed axis parallel to the axis of rotation of said crank shaft, and means preventing relative movement between said connecting rod and lever during a portion of the cyclic movement thereof, the foregoing parts being formed and positioned and coacting to provide with a substantially constant angular velocity of said crank shaft a piston acceleration adjacent the top of its up stroke.

7. In a mechanism for connecting the piston connecting rod to the crank shaft throw of a four-cycle internal combustion engine, a lever journalled intermediate its ends to said throw and adjacent one end to said connecting rod, an expansible and contractible link member having fixed limits of expansion and contraction pivotally connected at one end to the opposite end of said lever and at its other end about a fixed axis parallel to the axis of rotation of said crank shaft, and means preventing relative movement between said connecting rod and lever during a portion of the cyclic movement thereof, the foregoing parts being formed and positioned and coacting to provide with a substantially constant angular velocity of said crank shaft a piston acceleration adjacent the end of its intake stroke.

8. In a mechanism for connecting the piston connecting rod to the crank shaft throw of a four-cycle internal combustion engine, a lever journalled intermediate its ends to said throw and adjacent one end to said connecting rod, an expansible and contractible link member having fixed limits of expansion and contraction pivotally connected at one end to the opposite end of said lever and at its other end about a fixed axis parallel to the axis of rotation of said crank shaft, and means preventing relative movement between said connecting rod and lever during a portion of the cyclic movement thereof, the foregoing parts being formed and positioned and coacting to provide with a substantially constant angular velocity of said crank shaft a holding up of the piston at the end of its exhaust stroke for a substantial number of degrees of crank shaft rotation.

9. In a mechanism for connecting the piston connecting rod to the crank shaft throw of an internal combustion engine, a lever journalled intermediate its ends to said throw and adjacent one end to said connecting rod, an expansible and contractible link member having fixed limits of expansion and contraction pivotally connected at one end to the opposite end of said lever and at its other end about a fixed axis parallel to the axis of rotation of said crank shaft, and means preventing relative movement between said connecting rod and lever during the power stroke of said piston to provide a greater mechanical advantage of force application to the crank shaft than is obtainable where the connecting rod is attached directly to the crank shaft throw.

10. In a mechanism for connecting the piston connecting rod to the crank shaft throw of a four-cycle internal combustion engine, a lever journalled intermediate its ends to said throw and adjacent one end to said connecting rod, an expansible and contractible link member having fixed limits of expansion and contraction pivotally connected at one end to the opposite end of said lever and at its other end about a fixed axis parallel to the axis of rotation of said crank shaft, and means preventing relative movement between said connecting rod and lever during a portion of the cyclic movement thereof, the foregoing parts being formed and positioned and coacting to provide with a substantially constant angular velocity of said crank shaft an exhaust stroke of longer duration than the compression stroke.

11. In a mechanism for connecting the piston connecting rod to the crank shaft throw of an internal combustion engine, a lever journalled intermediate its ends to said throw and pivotally connected adjacent one end to said connecting rod, an expansible and contractible link member having fixed limits of expansion and contraction pivotally connected at one end to the opposite end of said lever and at its other end about a fixed axis parallel to the axis of said crank shaft and located with respect to the crank shaft axis in the quadrant preceding the top center position of said throw and radially outside the circumferential path of said throw, the means preventing relative movement between said connecting rod and lever during a portion of the cyclic movement thereof.

12. In a mechanism for connecting the piston connecting rod to the crank shaft throw of an internal combustion engine, a lever journalled intermediate its ends to said throw and pivotally connected adjacent one end to said connecting rod, an expansible and contractible link member having fixed limits of expansion and contraction pivotally connected at one end to the opposite end of said lever and at its other end about a fixed axis parallel to the axis of said crank shaft and located with respect to the crank shaft axis in the quadrant preceding the top center position of said throw and radially outside the circumferential path of said throw, and means preventing relative movement between said connecting rod and lever during a portion of the cyclic movement thereof, the several parts aforesaid being so designed and arranged that said link member will be fully contracted during movement of said throw in said quadrant and will be fully extended during movement of said throw in the diametrically opposite quadrant.

13. In a mechanism for connecting the piston to the crank shaft throw of an internal combustion engine, a lever journalled intermediate its ends to said throw for rotation about an axis parallel to the axis of rotation of the crank shaft, a connecting rod pivoted at one end to the piston and at its opposite end adjacent one end of said lever, the pivotal connections at the ends of said connecting rod being about axes parallel to the first named axes, and expansible link member having fixed limits of expansion and contraction pivoted at one end to the other end of said lever about an axis parallel to the aforesaid axes, the other end of said link member being pivoted about a fixed axis parallel to the axes aforesaid and located with respect to the crank shaft axis in the quadrant preceding the top center position of said throw and outside of the path of movement of said throw, the aforesaid parts being formed and positioned and coacting to provide a full contraction of said link member upon the movement of said throw in said quadrant to a position substantially perpendicular to said lever and wherein the included angle between said lever and link member is approximately 90° or greater, and a full expansion of said link member upon movement of said throw into the diametrical opposite quadrant, and means preventing relative rotative movement between said connecting rod and lever during a portion of the cycle of movement thereof.

14. In a mechanism for connecting the piston to the crank shaft throw of a four cycle internal combustion engine as such mechanism is characterized in claim 13 wherein said last named means comprises a pair of angularly related faces on said lever engageable with a pair of angularly related faces provided on said connecting rod and so arranged that one of said lever faces will engage one of said rod faces during the major portion of the power stroke of said piston and the other of said lever faces will engage the other of said rod faces adjacent the end of the exhaust stroke of said piston.

EDWARD H. SCHOEN.